(12) United States Patent
Scrivano

(10) Patent No.: US 12,524,395 B1
(45) Date of Patent: Jan. 13, 2026

(54) AUTOMATICALLY FIXING A CORRUPTED FILE REQUESTED BY A GUEST ON A HOST MACHINE

(71) Applicant: RED HAT, INC., Raleigh, NC (US)

(72) Inventor: Giuseppe Scrivano, Milan (IT)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 18/905,535

(22) Filed: Oct. 3, 2024

(51) Int. Cl.
*G06F 16/23* (2019.01)
*G06F 9/455* (2018.01)

(52) U.S. Cl.
CPC ...... *G06F 16/2365* (2019.01); *G06F 9/45545* (2013.01)

(58) Field of Classification Search
None
See application file for complete search history.

(56) References Cited

U.S. PATENT DOCUMENTS

| 10,019,323 | B1 * | 7/2018 | Bai | G06F 11/1004 |
| 2013/0262421 | A1 * | 10/2013 | Ferguson | H04L 9/0643 |
| | | | | 707/697 |
| 2015/0261521 | A1 * | 9/2015 | Choi | H04L 9/3236 |
| | | | | 713/176 |
| 2019/0156023 | A1 * | 5/2019 | Gerebe | G06F 21/51 |
| 2023/0244516 | A1 * | 8/2023 | De Marco | G06F 8/656 |
| | | | | 718/1 |
| 2025/0013738 | A1 * | 1/2025 | Knierim | G06F 21/629 |
| 2025/0238251 | A1 * | 7/2025 | Orsini | G06F 9/45558 |

* cited by examiner

*Primary Examiner* — Irene Baker
(74) *Attorney, Agent, or Firm* — Kilpatrick Townsend & Stockton LLP

(57) ABSTRACT

In one example, an operating system can receive, from a guest, a request for the content of a file stored on a computing device. The operating system and the guest can both be executing on the computing device. In response to receiving the request, the operating system can execute a validation process to validate an integrity of the file. In response to determining that the validation process failed, the operating system can transmit a first notification to an agent. In response to receiving the first notification, the agent can obtain a new copy of the file from a remote source. The agent can then transmit a second notification to the operating system. In response to receiving the second notification, the operating system can extract the content from the new copy of the file. The operating system can then provide the content to the guest to fulfill the request.

20 Claims, 3 Drawing Sheets

AUTOMATICALLY FIXING A CORRUPTED FILE REQUESTED BY A GUEST ON A HOST MACHINE

TECHNICAL FIELD

The present disclosure relates generally to guests such as virtual machines and containers that execute on a host machines. More specifically, but not by way of limitation, this disclosure relates to automatically fixing a corrupted file requested by a guest on a host machine.

BACKGROUND

There are various types of guests can be deployed on a host machine. One such type of guest is a virtual machine. A virtual machine is an emulation or virtualization of an actual physical computer system. Virtual machines include virtualized hardware and guest system software, such as a guest operating system and one or more applications. The virtualized hardware can emulate corresponding physical components, such as central processing units (CPUs), random access memory (RAM), network interfaces, and storage, that exist in a physical computer system. Virtual machines can be deployed a host operating system using virtualization software, such as a hypervisor.

Another type of guest can be a container. A container is a relatively isolated virtual environment that is generated by leveraging the resource isolation features of the Linux kernel (e.g., cgroups and namespaces). Containers can include guest system software, such as a guest operating system and one or more applications. Containers can be deployed on a host operating system using a container deployment engine, such as Docker®.

Both virtual machines and containers are deployed from image files, which are also referred to as "images." An image file is a static, executable file that can contain files, libraries, and dependencies needed to run a guest. For example, an image may contain all the operating system files required to execute a particular operating system inside a guest.

DETAILED DESCRIPTION

Figure 1:
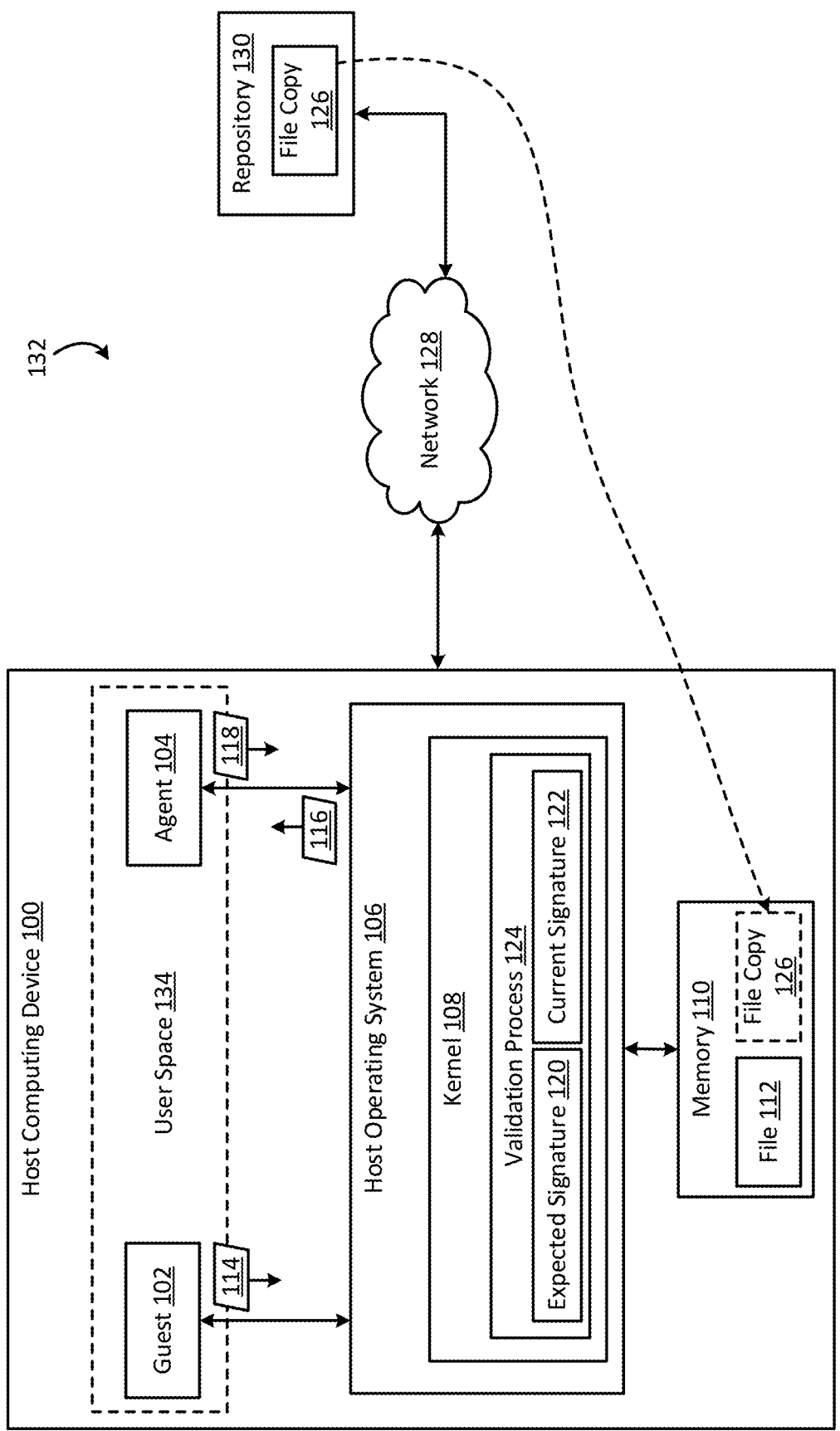
FIG. 1 shows a block diagram of an example of a system for automatically fixing a corrupted file requested by a guest, according to some aspects of the present disclosure.

A host computer system can use an image to deploy a guest, such as a virtual machine or a container. During the startup process of the guest, or while the guest is otherwise running, the guest may need to access a file. The file can be part of the image. For example, to finish the startup process, the guest may need the content of an operating system file included in the image. To obtain the file's content, the guest can transmit a request for the file's content to the host's operating system, which can obtain the file's content from storage and return it to the guest. While this process is normally relatively straightforward, problems can arise when the file has become corrupted. A file can be corrupted for any number of reasons. For example, a file may become corrupted unintentionally due to disk issues. A file may also become corrupted through malicious tampering to exploit a vulnerability. If the file requested by the guest is corrupted, it can cause runtime errors and vulnerabilities in the guest.

Some examples of the present disclosure can overcome one or more of the abovementioned problems by providing a self-healing system that can automatically detect that a file requested by a guest is corrupted, replace the corrupted file with an uncorrupted version of the file, and return the content of the uncorrupted file to the guest to fulfill the request. This can help prevent against runtime errors and malicious tampering.

More specifically, a host computer system can execute a host operating system on which a guest can be deployed from an image. At some point during the lifecycle of the guest, the guest can transmit a request for a file to the host operating system. The file may be a read-only file that is not supposed to change. In some examples, the request may take the form of a system call, which can be transmitted to a kernel of the host operating system. In response to receiving the request, the host operating system can execute a validation process to determine whether the requested file has been corrupted. The validation process can involve comparing an expected signature of the file to a current signature of the file to determine whether the two signatures match. If they do not match, it may indicate that the file has been corrupted and the validation process can fail. If the validation process fails, the host operating system can transmit a notification to an agent. The agent may be executing in user space on the host computer system. In response to receiving the notification, the agent can retrieve an uncorrupted copy of the file (e.g., from a remote repository), overwrite the corrupted file with the uncorrupted copy of the file, and transmit a notification to the host operating system. The notification can indicate to the host operating system that the uncorrupted version of the file is available. In response to receiving the notification, the host operating system can then extract the content from the uncorrupted copy of the file and provide it to the guest to fulfill the request. In this way, the agent and the host operating system can collaborate to fulfill the file request, while automatically detecting and fixing the corrupted file, which could otherwise cause problems with the execution of the guest.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 132 for automatically fixing a corrupted file requested by a guest 102, according to some aspects of the present disclosure. The guest 102 can be deployed on a host computing device 100, such as a laptop computer, desktop computer, or server. The host computing device 100 can execute a host operating system 106, such as Linux, which can have a kernel 108.

The guest 102 can be deployed on the host operating system 106 from an image file, such as a Docker image. The guest 102 can be a relatively isolated virtual environment. For example, the guest 102 can be a virtual machine or a container. The guest 102 may have a guest operating system, one or more applications, or other guest software.

At some point during the lifecycle of the guest 102, such as during a startup process, the guest 102 may need to obtain the content of a file 112. The file 112 can be stored in memory 110, which may be internal or external to the host computing device 100. Examples of the memory 110 can include a hard drive or random-access memory (RAM).

In some examples, the file 112 may be part of the image used to deploy the guest 102. For instance, the file 112 may be an operating system file or other base image file. A base image file is a file in a base image. A base image is an image that serves as starting point for building a final image, such as the image from which the guest 102 was deployed. Developers may begin with a base image and layer on top of it the necessary binaries, libraries, and/or configuration files for a given application, to thereby create the final image. For instance, a developer may start with a base image of an operating system and layer on top of it the binaries, libraries, and/or configuration files for a given application.

To obtain the content of a file 112, the guest 102 can transmit a request 114 for the file 112 to the host operating system 106. In particular, the guest 102 may transmit the request 114 to the kernel 108 of the host operating system 106. The request 114 may be a system call or another type of request.

The host operating system 106 can receive the request 114 and, in response, execute a validation process 124 with respect to the file 112. The validation process 124 can be configured to validate the integrity of the file 112 to ensure it has not been corrupted.

The validation process 124 can involve obtaining an expected signature 120 for the file 112. The expected signature 120 can be a signature for the file 112 that was previously generated at a prior point in time. An example of such a signature can be a checksum. The expected signature 120 may be obtained from any suitable source. For example, the host computing device 100 (e.g., the host operating system) can download the expected signature 1120 from a remote system, such as remote repository 130. As another example, the host computing device 100 (e.g., the host operating system 106) may have previously generated the expected signature 120 and stored it in memory 110, from which the expected signature 120 can be obtained for the validation process. The host computing device 100 may have previously generated the expected signature 120 at any suitable point in time. For instance, the expected signature 120 may have been generated when the file 112 was first downloaded to the host computing device 100.

The validation process 124 can also involve generating a current signature 122 for the file 112. The current signature 122 can be a signature that is generated at the current point in time, following the receipt of the request 114, based on the current content of the file 112. The host computing device 100 can generate the current signature 122 using the same signature algorithm (e.g., checksum algorithm) that was used to generate the expected signature 120.

After obtaining the expected signature 120 and the current signature 122, the host operating system 106 can compare the expected signature 120 to the current signature 122 to determine whether they match. The signatures can match if they are identical to one another. If they match, then the file 112 has "passed" the validation process and is likely not corrupted. So, the host operating system 106 can obtain the content of the file 112 and provide it to the guest 102 to fulfill the request 114. On the other hand, if the expected signature 120 does not match the current signature 122, then the file 112 has "failed" the validation process and it is likely corrupted. In response to determining that the validation process failed, the host operating system 106 can transmit a first notification 116. The first notification 116 can include an identifier of the file 112. For example, the first notification 116 can include a name of the file 112.

The first notification 116 can be received by an agent 104. The agent 104 is software that can assist with fixing corrupted files. In some examples, the agent 104 may be separate from the host operating system 106 and execute in user space 134. Alternatively, the agent 104 may be part of the host operating system 106. Either way, the agent 104 can receive the first notification 116, extract the identifier of the file 112 from the first notification 116, and use the identifier to retrieve a new copy of the file 126 that is uncorrupted. The agent 104 can retrieve the file copy 126 from a remote source, such as a repository 130. The agent 104 can retrieve the file copy 126 from the remote source via one or more networks 128, such as a local area network or the Internet. The agent 104 can then store the file copy 126 in memory 110. For example, the agent 104 may overwrite the existing file 112 with the file copy 126 in memory 110. Alternatively, the agent 104 may store the file copy 126 in a different location in memory 110, so that the existing file 112 is maintained along with the file copy 126. After storing the file copy 126 to memory 110, the agent 104 can transmit a second notification 118 to the host operating system 106. This can serve to notify the host operating system 106 that a new version of the file is available.

The host operating system 106 can receive the second notification 118 and, in response, obtain the content of the file copy 126. The host operating system 106 can then provide the content of the file copy 126 to the guest 102 to fulfill the request 114.

In some examples, before providing the content of the file copy 126 to the guest 102 to fulfill the request 114, the host operating system 106 can perform the validation process again using the file copy 126. For example, the host operating system 106 can generate a signature of the file copy 126. The host operating system 106 can then compare the signature to the expected signature 120 to determine whether they match. If they match, the host operating system 106 can provide the content of the file copy 126 to the guest 102 to fulfill the request 114. If they do not match, the host operating system 106 may output an error indicating the problem, so that a user can take corrective action.

Using the techniques described above, the system 132 can automatically detect that the file 112 has been corrupted and resolve the problem, in real time when the file 112 is requested by the guest 102. This can help avoid runtime errors, vulnerabilities, and/or other problems that could arise from a corrupted file. And because this whole process is transparent to the guest 102, the guest 102 is generally not affected (aside from the additional wait time to fix the file) and will continue the execution normally.

It will be appreciated that any of the above functionality attributed to the host operating system 106 may be implemented by the kernel 108 in some examples. For instance, the kernel 108 can receive the request 114 from the guest 102, execute the validation process 124, transmit the first notification 116 to the agent 104, receive the second notification 118 from the agent 104, etc.

Figure 2:
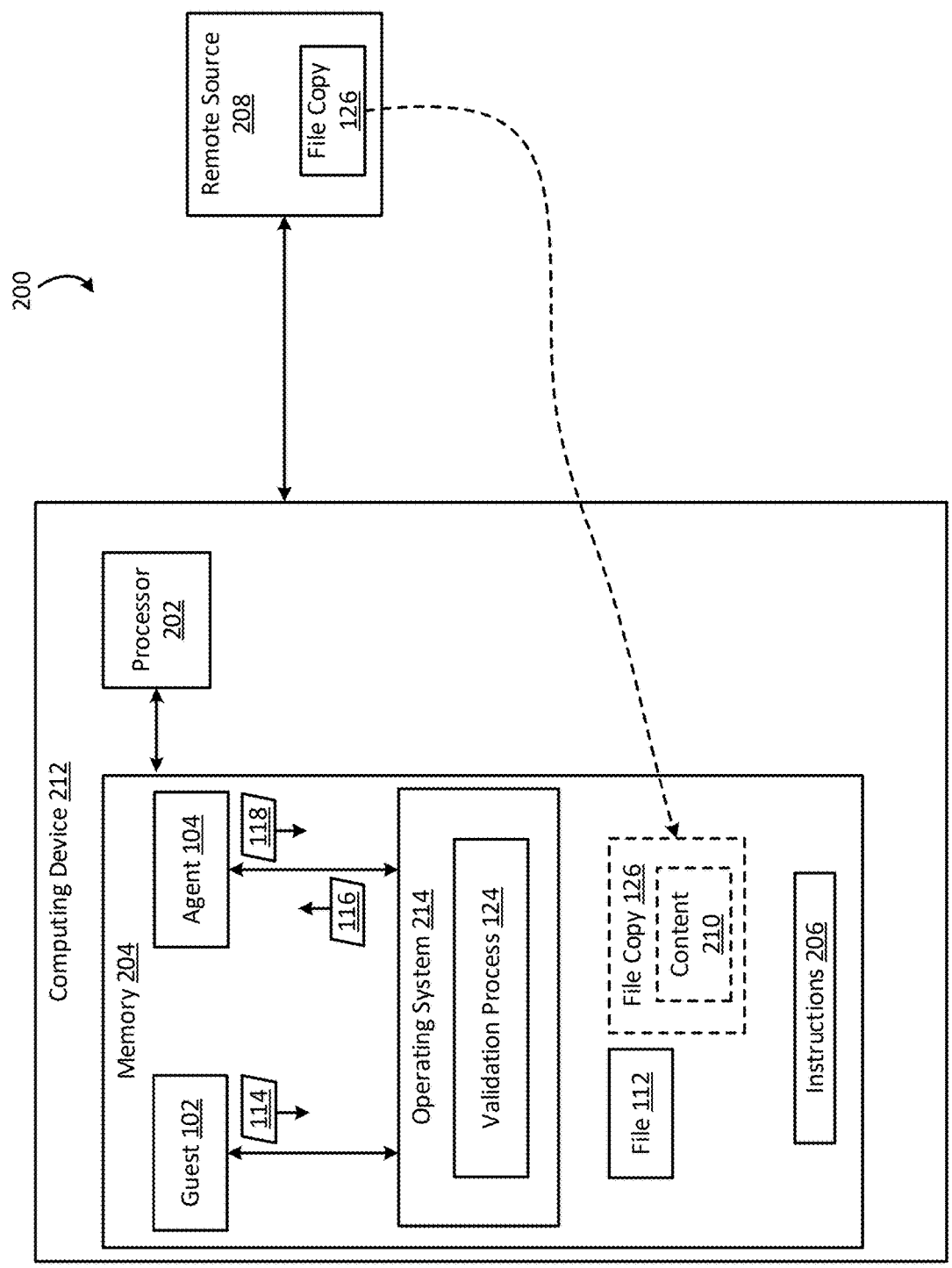
FIG. 2 shows a block diagram of an example of a computing device usable to implement some aspects of the present disclosure.

Turning now to FIG. 2, shown is a block diagram of an example of a computing device 212 usable to implement some aspects of the present disclosure. The computing device 212 can include a laptop computer, a desktop computer, a server, etc.

As shown, the computing device 212 includes a processor 202 communicatively coupled to a memory 204 by a bus. The processor 202 can include one processing device or multiple processing devices. Non-limiting examples of the processor 202 include a Field-Programmable Gate Array (FPGA), an application-specific integrated circuit (ASIC), a microprocessor, or any combination of these. The processor 202 can execute instructions 206 stored in the memory 204 to perform operations, such as any of the operations described above with respect to the host operating system 106 or agent 104. In some examples, the instructions 206 can include processor-specific instructions generated by a compiler or an interpreter from code written in any suitable computer-programming language, such as C, C++, C#, Python, or Java.

The memory 204 can include one memory device or multiple memory devices. The memory 204 can be volatile or non-volatile, such that the memory 204 retains stored information when powered off. Non-limiting examples of the memory 204 include electrically erasable and programmable read-only memory (EEPROM), flash memory, or any other type of non-volatile memory. At least some of the memory device can include a non-transitory computer-readable medium from which the processor 202 can read the instructions 206. A computer-readable medium can include electronic, optical, magnetic, or other storage devices capable of providing the processor 202 with computer-readable instructions or other program code. Non-limiting examples of a computer-readable medium can include magnetic disks, memory chips, ROM, random-access memory (RAM), an ASIC, a configured processor, optical storage, or any other medium from which a computer processor can read the instructions 206.

In some examples, the computing device 212 also includes an agent 104, an operating system 214 such as a host operating system, and a guest 102. The operating system 214 and agent 104 can perform the operations described above. For example, the operating system 214 can receive, from the guest 102 executing on the computing device 212, a request 114 for content of a file 112. The file 112 can be stored on the computing device 212, such as in memory 204. In response to receiving the request 114, the operating system 214 can execute a validation process 124 to validate an integrity of the file 112. In response to determining that the validation process 124 failed, the operating system 214 can transmit a first notification 116 to the agent 104. In response to receiving the first notification 116, the agent 104 can obtain a new copy of the file 126 from a remote source 208, such as a remote repository that is accessible via a network. After obtaining the new copy of the file 126, the agent 104 can transmit a second notification 118 to the operating system 214. The agent 104 may also overwrite the existing file 112 with the new copy of the file 126. The operating system 214 can receive the second notification 118. In response to receiving the second notification 118, the operating system 214 can extract the content 210 from the new copy of the file 126 and provide the content 210 to the guest 102 to fulfill the request 114. The guest 102 can then use the content 210 for its intended purpose, such as to execute an application.

Figure 3:
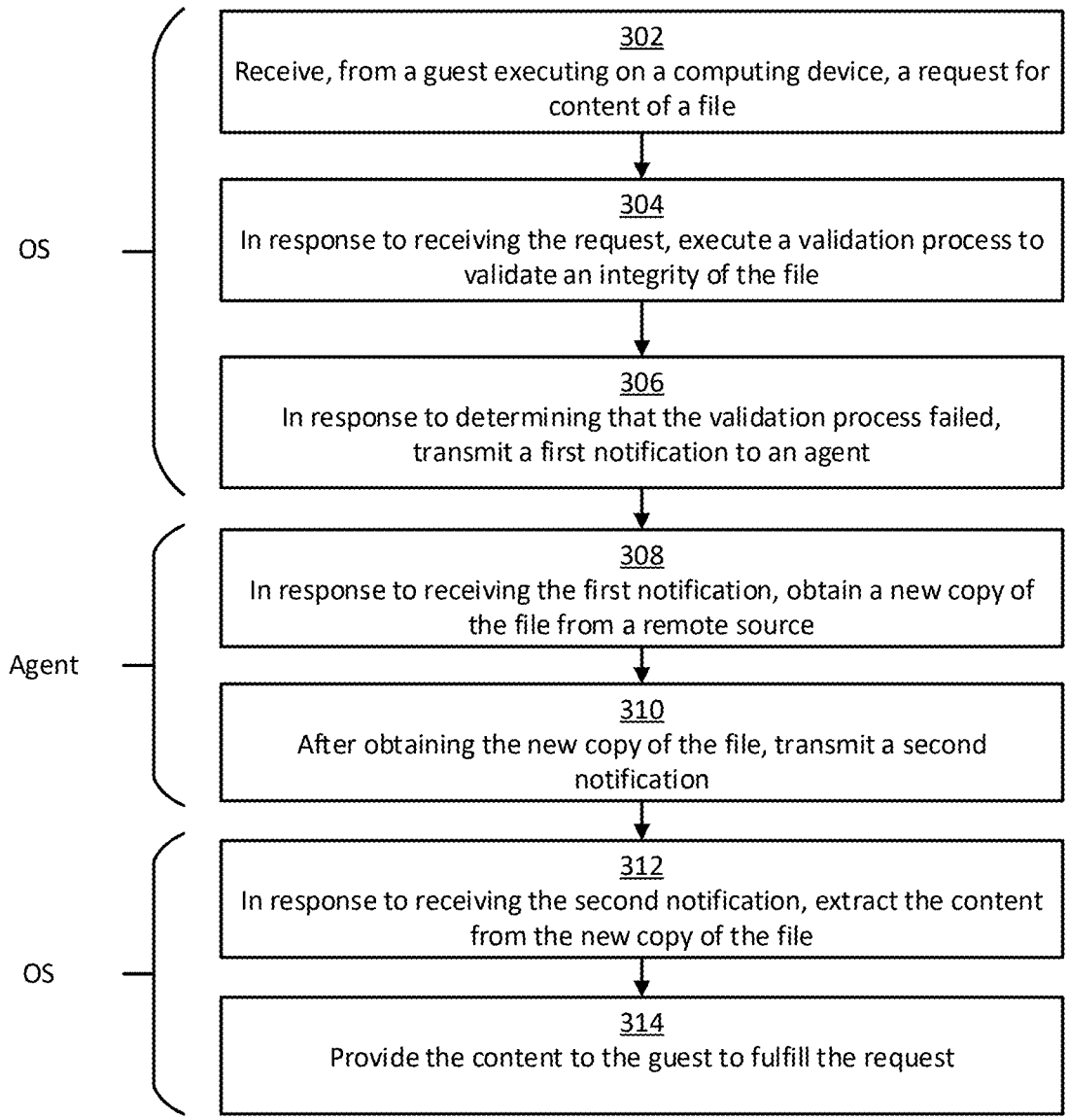
FIG. 3 shows a flowchart of an example of process for automatically fixing a corrupted file requested by a guest, according to some aspects of the present disclosure.

Turning now to FIG. 3, shown is a flowchart of an example of process for automatically fixing a corrupted file requested by a guest according to some aspects of the present disclosure. Other examples may include more operations, fewer operations, different operations, or a different order of operations than is shown in FIG. 3. The operations of FIG. 3 are described below with reference to the components of FIG. 2 described above.

In block 302, an operating system 214 receives a request 114 (e.g., a system call) from a guest 102 executing on a computing device 212, where the request 114 is for content of a file 112. The file 112 can be stored in the memory 204 of the computing device 212. The guest 102 can be a container deployed from a container image file, a virtual machine deployed from a virtual machine image file, etc.

In block 304, the operating system 214 executes a validation process 124 in response to receiving the request 114. The validation process 124 can be configured to validate the integrity of the file 112. In some examples, the validation process 124 can be implemented using FS-Verity. FS-Verity is a Linux kernel feature that does transparent on-demand integrity/authenticity verification of the contents of read-only files. FS-Verity can return an error message (e.g., an -EIO message) if the file 112 fails the integrity verification process.

In block 306, the operating system 214, in response to determining that the validation process 124 failed, transmits a first notification 116 to an agent 104. The agent 104 may be separate from the operating system 214. For example, FS-Verity can be used to implement the verification process. If the verification process fails, FS-Verity can return an error message, which can be detected by the operating system 214 and used as a triggering event to send the first notification 116 to the agent 104. In some examples, the error message can be detected by the operating system 214 using a seccomp agent, which is a security feature of the Linux kernel. The seccomp agent can intercept the error message and, based on the intercepting the error message, transmit the first notification 116 to trigger the agent 104.

In some examples, the agent 104 may be deployed prior to the guest 102 transmitting the request 114, so that the agent 104 is ready and waiting for the first notification 116. This may allow the agent 104 to more quickly respond to the first notification 116, thereby reducing latency in the process. In other examples, the agent 104 may be deployed in response to the failed verification process and may be shutdown after transmitting the second notification 118, so that it is executing for less time to conserve computing resources.

In block 308, the agent 104 receives the first notification 116 and, in response to receiving the first notification 116, the agent 104 obtains a new copy of the file 126 from a remote source 208. The remote source 208 is any source that is external to the computing device 212. In some examples, the remote source 208 may be an official source of the file, such as a developer of the file. The agent 104 may obtain the new copy of the file 126 from the remote source 208 by communicating with the remote source 208 via the Internet or a local area network. The new copy of the file 126 can be an uncorrupted version of the file.

In block 310, after obtaining the new copy of the file 126, the agent 104 transmits a second notification 118. The second notification 118 can be transmitted to the operating system 214. The second notification 118 may include an identifier or memory location for the new copy of the file 126.

In block 312, the operating system 214, in response to receiving the second notification 118, extracts the content 210 from the new copy of the file 126. For example, the operating system 214 may use the identifier or the memory location in the second notification 118 to open the new copy of the file 126 and extract the content 210 therefrom.

In block 314, the operating system 214 provides the content 210 to the guest 102 to fulfill the request 114. The guest 102 may then use the content 210 for various purposes.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code for an operating system, the operating system being executable by one or more processors of a computing device to perform operations including:
   receiving, from a guest executing on the computing device, a request for content of a file;
   in response to receiving the request, executing a validation process to validate an integrity of the file;
   in response to determining that the validation process failed, transmitting a first notification to an agent, wherein the agent is configured to:
      in response to receiving the first notification, obtain a new copy of the file from a remote source; and
      after obtaining the new copy of the file, transmit a second notification to the operating system; and
   in response to receiving the second notification:
      extracting the content from the new copy of the file; and
      providing the content to the guest to fulfill the request.

2. The non-transitory computer-readable medium of claim 1, wherein the agent is configured to overwrite the file on the computing device with the new copy of the file, prior to transmitting the second notification to the operating system.

3. The non-transitory computer-readable medium of claim 1, wherein the validation process involves:
   determining an expected signature for the file;
   determining a current signature for the file;
   comparing the expected signature to the current signature; and
   in response to determining that the expected signature does not match the current signature, determining that the validation process failed.

4. The non-transitory computer-readable medium of claim 3, wherein the expected signature is a first checksum that was previously generated for the file at a first point in time prior to receiving the request, and wherein the current signature is a second checksum that was generated for the file at a second point in time subsequent to receiving the request.

5. The non-transitory computer-readable medium of claim 1, wherein the request is formatted as a system call to the operating system.

6. The non-transitory computer-readable medium of claim 1, wherein the agent is separate from the operating system, and wherein the agent executes in user space on the computing device.

7. The non-transitory computer-readable medium of claim 1, wherein the file is part of an image used to deploy the guest.

8. The non-transitory computer-readable medium of claim 1, wherein the guest is a container or a virtual machine.

9. A method comprising:
   receiving, by an operating system and from a guest executing on a computing device, a request for content of a file;
   in response to receiving the request, executing, by the operating system, a validation process to validate an integrity of the file;
   in response to determining that the validation process failed, transmitting, by the operating system, a first notification to an agent;
   in response to receiving the first notification, obtaining, by the agent, a new copy of the file from a remote source;
   after obtaining the new copy of the file, transmitting, by the agent, a second notification to the operating system;
   in response to receiving the second notification, extracting, by the operating system, the content from the new copy of the file; and
   providing, by the operating system, the content to the guest to fulfill the request.

10. The method of claim 9, wherein the agent is configured to overwrite the file on the computing device with the new copy of the file, prior to transmitting the second notification to the operating system.

11. The method of claim 9, wherein the validation process involves:
    determining an expected signature for the file;
    determining a current signature for the file;
    comparing the expected signature to the current signature; and
    in response to determining that the expected signature does not match the current signature, determining that the validation process failed.

12. The method of claim 11, wherein the expected signature is a first checksum that was previously generated for the file at a first point in time prior to receiving the request, and wherein the current signature is a second checksum that was generated for the file at a second point in time subsequent to receiving the request.

13. The method of claim 9, wherein the request is formatted as a system call to the operating system.

14. The method of claim 9, wherein the agent is separate from the operating system, and wherein the agent executes in user space on the computing device.

15. The method of claim 9, wherein the file is part of an image used to deploy the guest.

16. The method of claim 9, wherein the guest is a container or a virtual machine.

17. A computing device comprising:
    an operating system;
    a guest;
    a processor; and
    a memory including instructions that are executable by the processor for causing the operating system to perform operations including:
       receiving, from the guest, a request for content of a file;
       in response to receiving the request, executing a validation process to validate an integrity of the file;
       in response to determining that the validation process failed, transmitting a first notification to an agent, wherein the agent is configured to:
          in response to receiving the first notification, obtain a new copy of the file from a remote source; and
          after obtaining the new copy of the file, transmit a second notification; and
       in response to receiving the second notification:
          extracting the content from the new copy of the file; and
          providing the content to the guest to fulfill the request.

18. The computing device of claim 17, wherein the agent is configured to overwrite the file on the computing device with the new copy of the file, prior to transmitting the second notification to the operating system.

19. The computing device of claim 17, wherein the validation process involves:
    determining an expected signature for the file;
    determining a current signature for the file;

comparing the expected signature to the current signature; and in response to determining that the expected signature does not match the current signature, determining that the validation process failed.

20. The computing device of claim 17, wherein the file is part of an image used to deploy the guest, and wherein the guest is a container or a virtual machine.

* * * * *